(12) United States Patent
Kuyama et al.

(10) Patent No.: US 12,509,739 B2
(45) Date of Patent: Dec. 30, 2025

(54) DECARBURIZATION END POINT DETERMINATION METHOD, DECARBURIZATION END POINT DETERMINATION DEVICE, SECONDARY REFINING OPERATION METHOD FOR STEEL MAKING, AND METHOD FOR PRODUCING MOLTEN STEEL

(71) Applicant: JFE STEEL CORPORATION, Tokyo (JP)

(72) Inventors: Shuji Kuyama, Tokyo (JP); Tomoyoshi Ogasahara, Tokyo (JP); Yoshie Nakai, Tokyo (JP); Keisuke Mizobata, Tokyo (JP); Tomoharu Ishida, Tokyo (JP); Masamichi Kikuchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 630 days.

(21) Appl. No.: 17/797,909

(22) PCT Filed: Feb. 2, 2021

(86) PCT No.: PCT/JP2021/003616
§ 371 (c)(1),
(2) Date: Aug. 5, 2022

(87) PCT Pub. No.: WO2021/157541
PCT Pub. Date: Aug. 12, 2021

(65) Prior Publication Data
US 2023/0083264 A1  Mar. 16, 2023

(30) Foreign Application Priority Data
Feb. 6, 2020 (JP) .................... 2020-018450

(51) Int. Cl.
| | |
|---|---|
| C21C 7/06 | (2006.01) |
| C21C 7/068 | (2006.01) |
| C21C 7/072 | (2006.01) |
| C21C 7/10 | (2006.01) |
| F27D 7/06 | (2006.01) |
| G01N 33/2025 | (2019.01) |

(52) U.S. Cl.
CPC .............. *C21C 7/068* (2013.01); *C21C 7/072* (2013.01); *C21C 7/10* (2013.01); *F27D 7/06* (2013.01);
(Continued)

(58) Field of Classification Search
CPC ........ C21C 2005/5288; C21C 2300/06; C21C 5/4673; C21C 7/068; C21C 7/10;
(Continued)

(56) References Cited

U.S. PATENT DOCUMENTS

| | | |
|---|---|---|
| 5,327,357 A | 7/1994 | Feinstein et al. |
| 2004/0182203 A1 | 9/2004 | Nakao et al. |

FOREIGN PATENT DOCUMENTS

| | | |
|---|---|---|
| CN | 101881981 A | 11/2010 |
| CN | 102766730 A | 11/2012 |

(Continued)

OTHER PUBLICATIONS

Jul. 10, 2023 extended Search Report issued in European Patent Application No. 21750361.4.
(Continued)

*Primary Examiner* — Nicholas A Wang
(74) *Attorney, Agent, or Firm* — Oliff PLC

(57) ABSTRACT

A decarburization end point determination method includes: estimating the carbon concentration and oxygen concentration of the molten steel and carbon dioxide gas concentration of exhaust gas in the vacuum chamber by using measure-
(Continued)

ment values of the carbon concentration and the oxygen concentration of the molten steel, a measurement value of internal pressure of the vacuum chamber, and a model formula; correcting a parameter included in the model formula to reduce at least one of a difference between an estimate value and a measurement value of the oxygen concentration and a difference between an estimate value and a measurement value of the carbon dioxide gas concentration of the exhaust gas; estimating the carbon concentration of the molten steel by using the model formula in which the parameter is corrected; and determining timing when an estimate value reaches a target value as the completion time point of the vacuum decarburization treatment.

11 Claims, 6 Drawing Sheets

(52) U.S. Cl.
CPC ... *G01N 33/2025* (2019.01); *F27D 2007/066* (2013.01)

(58) Field of Classification Search
CPC ..... C21C 7/0068; C21C 7/0075; C21C 7/072; F27D 2007/066; F27D 7/06; G01N 33/2025
See application file for complete search history.

(56) References Cited

FOREIGN PATENT DOCUMENTS

| | | | |
|---|---|---|---|
| CN | 103382514 A | | 11/2013 |
| EP | 0 545 379 B1 | | 4/1996 |
| IN | 840MUM2014 | * | 10/2015 |
| JP | S59-185720 A | | 10/1984 |
| JP | H5-239540 A | | 9/1993 |
| JP | H05239540 | * | 9/1993 |
| JP | H09-202913 A | | 8/1997 |
| JP | H11-172323 A | | 6/1999 |
| JP | H11172323 | * | 6/1999 |
| JP | 2006-104521 A | | 4/2006 |
| JP | 2007-169717 A | | 7/2007 |
| JP | 2008-266751 A | | 11/2008 |
| JP | 2015-101742 A | | 6/2015 |
| JP | 2015101742 | * | 6/2015 |
| JP | 2016-141875 A | | 8/2016 |
| JP | 6007887 B2 | | 10/2016 |
| JP | 6447198 B2 | | 1/2019 |
| KR | 10-0148273 B1 | | 11/1998 |
| RU | 2 173 715 C2 | | 11/1999 |
| RU | 2 213 147 C2 | | 9/2003 |
| SU | 697573 A1 | | 11/1979 |
| WO | 03/004707 A1 | | 1/2003 |

OTHER PUBLICATIONS

Apr. 13, 2021 International Search Report issued in Patent Application No. PCT/JP2021/003616.
Nov. 1, 2014, 2023 Office Action issued in Korean Patent Application No. 10-2022-7025850.
Feb. 11, 2023 Office Action issued in Chinese Patent Application No. 202180012349.5.
Jan. 26, 2023 Office Action issued in Russian Patent Application No. 2022122706.

* cited by examiner

DECARBURIZATION END POINT DETERMINATION METHOD, DECARBURIZATION END POINT DETERMINATION DEVICE, SECONDARY REFINING OPERATION METHOD FOR STEEL MAKING, AND METHOD FOR PRODUCING MOLTEN STEEL

FIELD

The present invention relates to a decarburization end point determination method, a decarburization end point determination device, a steelmaking secondary refining operation method for steel making, and a method for producing molten steel.

BACKGROUND

In recent years, there is an increasing demand for reduction of strength variation with respect to a high-grade steel plate such as a medium-carbon high-tensile steel plate (medium-carbon high-tensile steel plate) or ultra-low carbon steel used as an automobile member. Accordingly, there is an increasing demand for a stricter component adjustment in a steelmaking process of a steel production process. Specifically, there is a medium-carbon high-tensile steel plate produced by reduction of carbon concentration of molten steel from about 300 ppm to about 100 ppm in a vacuum degassing process that is one of secondary refining processes for steel making.

Furthermore, there is also ultra-low carbon steel produced by reduction of the carbon concentration of the molten steel from about 300 ppm to about five to several tens of ppm. It has been demanded to quickly and accurately perform vacuum decarburization treatment for these.

However, a technique for measuring the carbon concentration of the molten steel during the vacuum decarburization treatment in real time has not been established. For this reason, conventionally, a method of indirectly estimating the carbon concentration of the molten steel from other measurement information that is not the carbon concentration of the molten steel, and performing completion determination (end point determination) of the vacuum decarburization treatment on the basis of the estimated carbon concentration of the molten steel is employed.

Specifically, Patent Literature 1 describes a vacuum degassing device that estimates carbon concentration of molten steel on the basis of reflux volume of molten steel which volume is calculated in consideration of a change in an inner diameter of an immersion pipe, a mass balance equation of carbon, a decarburization rate, and an in-tank reaction model formula. Then, the vacuum degassing device described in Patent Literature 1 ends the vacuum decarburization treatment at timing when the estimated carbon concentration of the molten steel reaches a target value.

Patent Literature 2 describes a method of previously determining a relationship among three that are carbon concentration of molten steel, dissolved oxygen concentration of the molten steel, and CO gas concentration of exhaust gas exhausted from a vacuum degassing facility. Then, in the method described in Patent Literature 2, a time point at which the carbon concentration of the molten steel reaches a target value is determined as a completion time point of vacuum decarburization treatment, the carbon concentration of the molten steel being estimated from the dissolved oxygen concentration of the molten steel and the CO gas concentration of the exhaust gas, which dissolved oxygen concentration and CO gas concentration are measured during the treatment, on the basis of the relationship among the three.

Patent Literature 3 describes a method of constructing a model for calculating a change rate in carbon concentration of molten steel by using a mathematical model including the carbon concentration of the molten steel, pressure in a vacuum chamber, dissolved oxygen concentration of the molten steel, and molten steel mass. In addition, in the method described in Patent Literature 3, the carbon concentration of the molten steel is estimated over time by an observer that makes a correction by adding a value, which is acquired by a multiplication of a difference between a carbon outflow rate from the entire molten steel, which rate is acquired from the model, and a carbon outflow rate in the exhaust gas by a coefficient, to a change rate of the carbon concentration of the molten steel. Then, the method described in Patent Literature 3 ends vacuum decarburization treatment when the estimated carbon concentration of the molten steel reaches a target value.

CITATION LIST

Patent Literature

Patent Literature 1: Japanese Patent Application Laid-open No. 2015-101742
Patent Literature 2: Japanese Patent Application Laid-open No. 2007-169717
Patent Literature 3: Japanese Patent Application Laid-open No. 2006-104521

SUMMARY

Technical Problem

However, in the method described in Patent Literature 1, the dissolved oxygen concentration of the molten steel and the carbon dioxide gas concentration of the exhaust gas which dissolved oxygen concentration and carbon dioxide gas concentration are measured during the vacuum decarburization treatment are not utilized. Thus, there is a possibility that the carbon concentration of the molten steel is erroneously estimated due to bias of data used for parameter identification of the model formula or an uncertain factor not considered in the model. On the other hand, in the method described in Patent Literature 2, when it is desired to continuously know a change in the carbon concentration of the molten steel just before the end point of the vacuum decarburization treatment, it is necessary to sequentially measure the dissolved oxygen concentration of the molten steel. However, in order to accurately measure the dissolved oxygen concentration of the molten steel, it is necessary to sequentially collect the molten steel from a molten steel ladle and put the molten steel in a separately-prepared analyzer, which is not realistic since time and labor are necessary. In addition, in the method described in Patent Literature 3, since the dissolved oxygen concentration of the molten steel which concentration is important information for knowing the carbon concentration of the molten steel is not used, there is a high possibility that prediction accuracy of the carbon concentration of the molten steel becomes low as compared with that of the method described in Patent Literature 2.

The present invention has been made in view of the above problems, and an object thereof is to provide a decarburization end point determination method and a decarburization end point determination device which are capable of accurately estimating carbon concentration of molten steel and accurately determining an end point of vacuum decarburization treatment. Furthermore, another object of the present invention is to provide a secondary refining operation method for steel making capable of performing secondary refining operation highly accurately and stably. In addition, another object of the present invention is to provide a method for producing molten steel with which method the molten steel can be produced highly accurately and stably.

Solution to Problem

To solve the problem and achieve the object, a decarburization end point determination method according to the present invention for determining a completion time point of vacuum decarburization treatment in a facility that performs the vacuum decarburization treatment of reducing carbon concentration of molten steel by degassing a vacuum chamber, the method includes: an estimation step of estimating the carbon concentration and oxygen concentration of the molten steel and carbon dioxide gas concentration of exhaust gas in the vacuum chamber during the vacuum decarburization treatment by using measurement values of the carbon concentration and the oxygen concentration of the molten steel before the vacuum decarburization treatment is started, a measurement value of internal pressure of the vacuum chamber, and a model formula of the vacuum decarburization treatment; and a determination step of correcting a parameter included in the model formula in such a manner as to reduce at least one of a difference between an estimate value and a measurement value of the oxygen concentration of the molten steel at timing when the oxygen concentration of the molten steel is measured during the vacuum decarburization treatment and a difference between an estimate value and a measurement value of the carbon dioxide gas concentration of the exhaust gas at timing when the carbon dioxide gas concentration of the exhaust gas is measured during the vacuum decarburization treatment, estimating the carbon concentration of the molten steel by using the model formula in which the parameter is corrected, and determining timing when an estimate value reaches a target value as the completion time point of the vacuum decarburization treatment.

Moreover, in the decarburization end point determination method according to the present invention, the determination step includes a step of calculating a probable value of the parameter when at least one of the measurement value of the oxygen concentration of the molten steel and the measurement value of the carbon dioxide gas concentration of the exhaust gas is acquired, by an inverse analysis using Bayesian inference.

Moreover, in the decarburization end point determination method according to the present invention, the parameter is a decarburization capacity coefficient.

Moreover, a decarburization end point determination device according to the present invention that determines a completion time point of vacuum decarburization treatment in a facility that performs the vacuum decarburization treatment of reducing carbon concentration of molten steel by degassing a vacuum chamber, the device includes: an estimation means configured to estimate the carbon concentration and oxygen concentration of the molten steel and carbon dioxide gas concentration of exhaust gas in the vacuum chamber during the vacuum decarburization treatment by using measurement values of the carbon concentration and the oxygen concentration of the molten steel before the vacuum decarburization treatment is started, a measurement value of internal pressure of the vacuum chamber, and a model formula of the vacuum decarburization treatment; and a determination means configured to correct a parameter included in the model formula in such a manner as to reduce at least one of a difference between an estimate value and a measurement value of the oxygen concentration of the molten steel at timing when the oxygen concentration of the molten steel is measured during the vacuum decarburization treatment and a difference between an estimate value and a measurement value of the carbon dioxide gas concentration of the exhaust gas at timing when the carbon dioxide gas concentration of the exhaust gas is measured during the vacuum decarburization treatment, estimate the carbon concentration of the molten steel by using the model formula in which the parameter is corrected, and determine timing when an estimate value reaches a target value as the completion time point of the vacuum decarburization treatment.

Moreover, in the decarburization end point determination device according to the present invention, the determination means calculates a probable value of the parameter when at least one of the measurement value of the oxygen concentration of the molten steel and the measurement value of the carbon dioxide gas concentration of the exhaust gas is acquired, by an inverse analysis using Bayesian inference.

Moreover, in the decarburization end point determination device according to the present invention, the parameter is a decarburization capacity coefficient.

Moreover, a secondary refining operation method for steel making according to the present invention includes a step of performing operation end determination of a secondary refining process for steel making, by the decarburization end point determination method according to the present invention.

Moreover, a method for producing molten steel according to the present invention includes a step of producing the molten steel by using the secondary refining operation method for steel making according to the present invention.

Advantageous Effects of Invention

According to a decarburization end point determination method and a decarburization end point determination device of the present invention, it is possible to accurately estimate carbon concentration of molten steel and to accurately determine an end point of vacuum decarburization treatment. In addition, according to a secondary refining operation method for steel making of the present invention, secondary refining operation can be performed highly accurately and stably. Furthermore, according to a method for producing molten steel of the present invention, the molten steel can be produced highly accurately and stably.

DESCRIPTION OF EMBODIMENTS

Hereinafter, a decarburization end point determination method that is one embodiment of the present invention will be described in detail with reference to the drawings.

[Configuration of a Vacuum Degassing Facility]

First, with reference to FIG. 1, a configuration of a vacuum degassing facility to which the decarburization end point determination method that is the one embodiment of the present invention is applied will be described.

Figure 1:
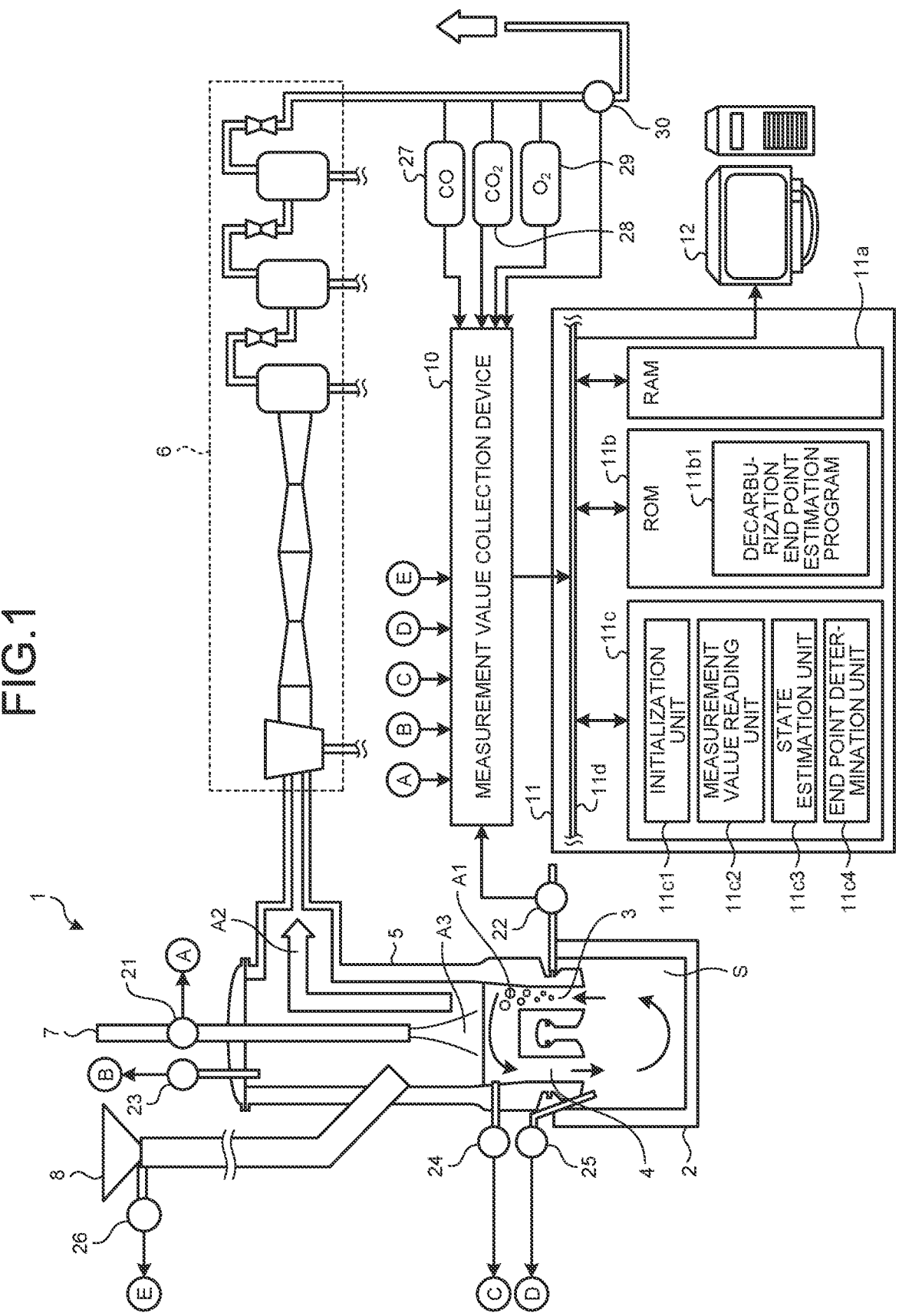
FIG. 1 is a view illustrating a configuration of a vacuum degassing facility to which a decarburization end point determination method that is one embodiment of the present invention is applied.

FIG. 1 is a view illustrating the configuration of the vacuum degassing facility to which the decarburization end point determination method that is the one embodiment of the present invention is applied.

A vacuum degassing facility 1 to which the decarburization end point determination method according to the one embodiment of the present invention illustrated in FIG. 1 is applied is one of secondary refining facilities in a steel mill of a steelworks. As illustrated in FIG. 1, the vacuum degassing facility 1 includes a ladle 2 that houses molten steel S, a suction pipe 3 and an exhaust pipe 4 immersed in the molten steel S, a vacuum chamber 5, a vacuum device 6, an oxygen feeding lance 7, and a hopper 8.

When vacuum decarburization treatment is performed by utilization of the vacuum degassing facility 1, an argon gas (reflux gas) A1 is blown into the suction pipe 3 while pressure in the vacuum chamber 5 is reduced to several tens to one hundred mhPa by utilization of the vacuum device 6. Thus, the molten steel S in the suction pipe 3 is raised into the vacuum chamber 5 by an air lift pump action, and the molten steel S is refluxed into the ladle 2 via the exhaust pipe 4. In this process of pressure reduction and reflux, oxygen and carbon in the molten steel S react (decarburization reaction) and form a carbon dioxide gas, and the carbon dioxide gas is taken into bubbles of the argon gas A1 in the molten steel S. Then, the bubbles of the argon gas A1 that takes in the carbon dioxide gas are exhausted to the outside of the vacuum chamber 5 as exhaust gas A2 via the vacuum chamber 5. This reduces carbon concentration of the molten steel S from about 300 ppm to 10 to 100 ppm. In order to accelerate the decarburization reaction, a pure oxygen gas A3 may be blown from the oxygen feeding lance 7 inserted into the vacuum chamber 5 from an upper part of the vacuum chamber 5 at an initial stage of the vacuum decarburization treatment, and the oxygen may be dissolved in the molten steel S. In addition, in the latter half of the vacuum decarburization treatment, an Al ore or the like may be fed from the hopper 8 in order to stop the decarburization reaction.

The vacuum degassing facility 1 includes a measurement value collection device 10, a decarburization end point estimation device 11, and a display device 12 as a control system.

The measurement value collection device 10 is connected to an oxygen feeding lance flowmeter 21, a reflux gas flowmeter 22, a vacuum chamber internal pressure meter 23, a thermometer 24, a dissolved oxygen meter 25, an auxiliary raw material meter 26, an exhaust gas CO concentration meter 27, an exhaust gas $CO_2$ concentration meter 28, an exhaust gas 02 concentration meter 29, and an exhaust gas flowmeter 30. The measurement value collection device 10 acquires measurement values from these measurement devices at every predetermined control cycle, and outputs the acquired measurement values to the decarburization end point estimation device 11.

The oxygen feeding lance flowmeter 21 measures a flow rate of the pure oxygen gas A3 blown into the vacuum chamber 5 from the oxygen feeding lance 7 (oxygen flow rate), and inputs a measurement value of the oxygen flow rate to the measurement value collection device 10. The reflux gas flowmeter 22 measures a flow rate of the argon gas A1 blown into the suction pipe 3, and inputs a measurement value of the flow rate of the argon gas A1 to the measurement value collection device 10. The vacuum chamber internal pressure meter 23 measures internal pressure of the vacuum chamber 5 (vacuum chamber internal pressure) and inputs a measurement value of the vacuum chamber internal pressure to the measurement value collection device 10. The thermometer 24 measures an inner wall temperature of a lower portion of the vacuum chamber 5, and inputs a measurement value of the inner wall temperature to the measurement value collection device 10. The dissolved oxygen meter 25 measures dissolved oxygen concentration of the molten steel S in the ladle 2, and inputs a measurement value of the dissolved oxygen concentration to the measurement value collection device 10.

The auxiliary raw material meter 26 measures weight of auxiliary raw material fed from the hopper 8, and inputs a measurement value of the weight of the auxiliary raw material to the measurement value collection device 10. The exhaust gas CO concentration meter 27 measures CO concentration (carbon dioxide gas concentration) of the exhaust gas A2 exhausted from the vacuum device 6, and inputs a measurement value of the CO concentration to the measurement value collection device 10. The exhaust gas $CO_2$ concentration meter 28 measures $CO_2$ concentration of the exhaust gas A2 exhausted from the vacuum device 6, and inputs a measurement value of the $CO_2$ concentration to the measurement value collection device 10. The exhaust gas 02 concentration meter 29 measures oxygen concentration of the exhaust gas A2 exhausted from the vacuum device 6, and inputs a measurement value of the oxygen concentration to the measurement value collection device 10. The exhaust gas flowmeter 30 measures a flow rate of the exhaust gas A2 exhausted from the vacuum device 6, and inputs a measurement value of the flow rate to the measurement value collection device 10.

The decarburization end point estimation device 11 includes an information processing device such as a computer, and includes a random access memory (RAM) 11a, a read only memory (ROM) lib, and an arithmetic processing unit 11c. The RAM 11a, the ROM lib, and the arithmetic processing unit 11c are electrically connected via a bus wiring line lid.

The RAM 11a functions as a working space of the arithmetic processing unit 11c by temporarily storing a computer program executed by the arithmetic processing unit 11c and various kinds of data necessary for executing the computer program. In the present embodiment, when decarburization end point determination processing (described later) is executed, values of variables and constants illustrated in Table 1 to 7 in the following are stored in the RAM 11a in addition to a decarburization end point estimation program 11b1 (described later), and the values of the variables are sequentially updated in a process of the decarburization end point determination processing.

State variables included in a model formula of a decarburization reaction (described later) are illustrated in Table 1. An adjustment parameter of the model formula of the decarburization reaction is illustrated in Table 2. Input variables of the model formula of the decarburization reaction are illustrated in Table 3. Output variables calculated from the model formula of the decarburization reaction are illustrated in Table 4. Constants included in the model formula of the decarburization reaction are illustrated in Table 5. Intermediate variables used in the model formula of the decarburization reaction (variables temporarily used to calculate the state variables illustrated in Table 1) are illustrated in Table 6. Measurement values of the output variables calculated from the model formula of the decarburization reaction are illustrated in Table 7.

TABLE 1

| Term | Unit | Description |
|---|---|---|
| $m_{c,v}$ | kg | Carbon weight in molten steel in vacuum chamber |
| $m_{c,l}$ | kg | Carbon weight in molten steel in ladle |
| $m_{o,v}$ | kg | Dissolved oxygen weight in molten steel in vacuum chamber |
| $m_{o,l}$ | kg | Dissolved oxygen weight in molten steel in ladle |
| $C_{co,g}$ | mol mol$^{-1}$ | Molar fraction of carbon dioxide gas in gas phase in vacuum chamber |

TABLE 2

| Term | Unit | Description |
|---|---|---|
| $K_v$ | kg kg$^{-1}$ Pa$^{-1}$ m$^{-1}$ s$^{-1}$ | Decarburization capacity coefficient |

TABLE 3

| Term | Unit | Description |
|---|---|---|
| $p_v$ | Pa | Vacuum chamber internal pressure |
| $V_{arg}$ | m$^3$ s$^{-1}$ | Argon gas flow rate |
| $V_{off25}$ | kg | EXHAUST GAS FLOW RATE |
| $f_{c,add}$ | kg s$^{-1}$ | Mass flow rate of carbon from fed auxiliary raw material to molten steel which rate is calculated from weight measurement value of fed auxiliary raw material |
| $f_{a,add}$ | kg s$^{-1}$ | Mass flow rate of aluminum from fed auxiliary raw material to molten steel which rate is calculated from weight measurement value of fed auxiliary raw material |

TABLE 4

| Term | Unit | Description |
|---|---|---|
| $C_{c,l}$ | kg kg$^{-1}$ | Carbon mass fraction of molten steel in ladle |
| $C_{o,l}$ | kg kg$^{-1}$ | Oxygen mass fraction of molten steel in ladle |
| $C_{co,g}$ | mol mol$^{-1}$ | Molar fraction of carbon dioxide gas in gas phase in vacuum chamber |

TABLE 5

| Term | Unit | Value | Description |
|---|---|---|---|
| $D_s$ | m | 6.0e−1 | Immersion pipe diameter |
| B | m$^{-4/3}$ kg s$^{-4/3}$ | 7.0e+3 | Mass velocity coefficient of reflux |
| g | N kg$^{-1}$ | 9.8 | Gravitational acceleration |
| $M_{Al}$ | kg mol$^{-1}$ | 2.7e−2 | Molar mass of aluminum |
| $M_{Ar}$ | kg mol$^{-1}$ | 4.0e−2 | Molar mass of argon |
| $M_C$ | kg mol$^{-1}$ | 1.2e−2 | Molar mass of carbon |
| $M_O$ | kg mol$^{-1}$ | 1.6e−2 | Molar mass of oxygen |
| $P_{ail}$ | Pa | 1.0e+5 | Pressure of reflux argon gas |
| $P_{atm}$ | Pa | 1.0e+5 | Atmospheric pressure |
| $P_i$ | Pa | | Pressure of formed bubble in molten steel |
| R | JK$^{-1}$ mol$^{-1}$ | 8.3 | Gas constant |
| $T_s$ | K | | Molten steel temperature |
| $T_g$ | K | | Gas temperature in vacuum chamber |
| p | kg m$^{-3}$ | 7.0e+3 | Molten steel density |
| $V_v$ | m$^3$ | 1.5 | Vacuum chamber volume |

TABLE 6

| Term | Unit | Description | Calculation formula |
|---|---|---|---|
| $C_{c,v}$ | kg kg$^{-1}$ | Carbon mass fraction of molten steel in vacuum chamber | $m_{c,v}/m_{s,v}$ |
| $C_{c,l}$ | kg kg$^{-1}$ | Carbon mass fraction of molten steel in ladle | $m_{c,l}/m_{s,l}$ |
| $C_{o,v}$ | kg kg$^{-1}$ | Oxygen mass fraction of molten steel in vacuum chamber | $m_{o,v}/m_{s,v}$ |
| $C_{o,l}$ | kg kg$^{-1}$ | Oxygen mass fraction of molten steel in ladle | $m_{o,l}/m_{s,l}$ |
| $f_{arg}$ | kg s$^{-1}$ | Mass velocity of reflux argon gas | $v_{arg} M_{Ar} P_{atm}/(RT)$ |
| $f_{dec}$ | kg s$^{-1}$ | Decarburization rate | $-K_v (K_{Cc,v} C_{o,v} - p_v)$ |
| $f_{cir}$ | kg s$^{-1}$ | Reflux flow rate | $B \cdot D_s^{4/3} v_{arg}^{1/3}$ $(\log (P_{ail}/p_v))^{1/3}$ |
| K | Pa kg$^2$ kg$^{-2}$ | Carbon-oxygen reaction coefficient | $10^{(10447/T_s + 18.038)}$ |

TABLE 7

| Term | Unit | Description |
|---|---|---|
| $\hat{c}_{c,l}$ | kg kg$^{-1}$ | Measurement value of carbon mass fraction of molten steel in ladle |
| $\hat{c}_{o,l}$ | kg kg$^{-1}$ | Measurement value of oxygen mass fraction of molten steel in ladle |
| $\hat{c}_{co,g}$ | mol mol$^{-1}$ | Measurement value of molar fraction of carbon dioxide gas in gas phase in vacuum chamber |

The ROM 11b includes a non-volatile storage device, and stores a computer program such as the decarburization end point estimation program 11b1, and various kinds of control data.

The arithmetic processing unit 11c includes an electronic circuit such as a central processing unit (CPU) inside the information processing device. The arithmetic processing unit 11c controls an operation of the entire decarburization end point estimation device 11 by loading the computer program stored in the ROM 11b into the RAM 11a and executing the loaded computer program. In the present embodiment, the arithmetic processing unit 11c functions as an initialization unit 11c1, a measurement value reading unit 11c2, a state estimation unit 11c3, and an end point determination unit 11c4 by executing the decarburization end point estimation program 11b1. Functions of these units will be described later.

The display device 12 includes a known display device such as a liquid crystal display device, and visibly displays various kinds of information in accordance with a control signal from the decarburization end point estimation device 11. In the present embodiment, the display device 12 visually displays an input variable value of the model formula of the decarburization reaction, an output variable value, and a measurement value of the output variable at each calculation cycle similar to that of the decarburization end point estimation device 11. Furthermore, the display device 12 visually displays information related to an end point of the vacuum decarburization treatment.

In the vacuum degassing facility 1 having such a configuration, the decarburization end point estimation device 11 estimates the carbon concentration of the molten steel S and determines the end point of the vacuum decarburization treatment by executing the following decarburization end point determination processing. In the following, the operation of the decarburization end point estimation device 11 in execution of the decarburization end point determination processing will be described with reference to a flowchart illustrated in FIG. 2.

[Decarburization End Point Determination Processing]

Figure 2:
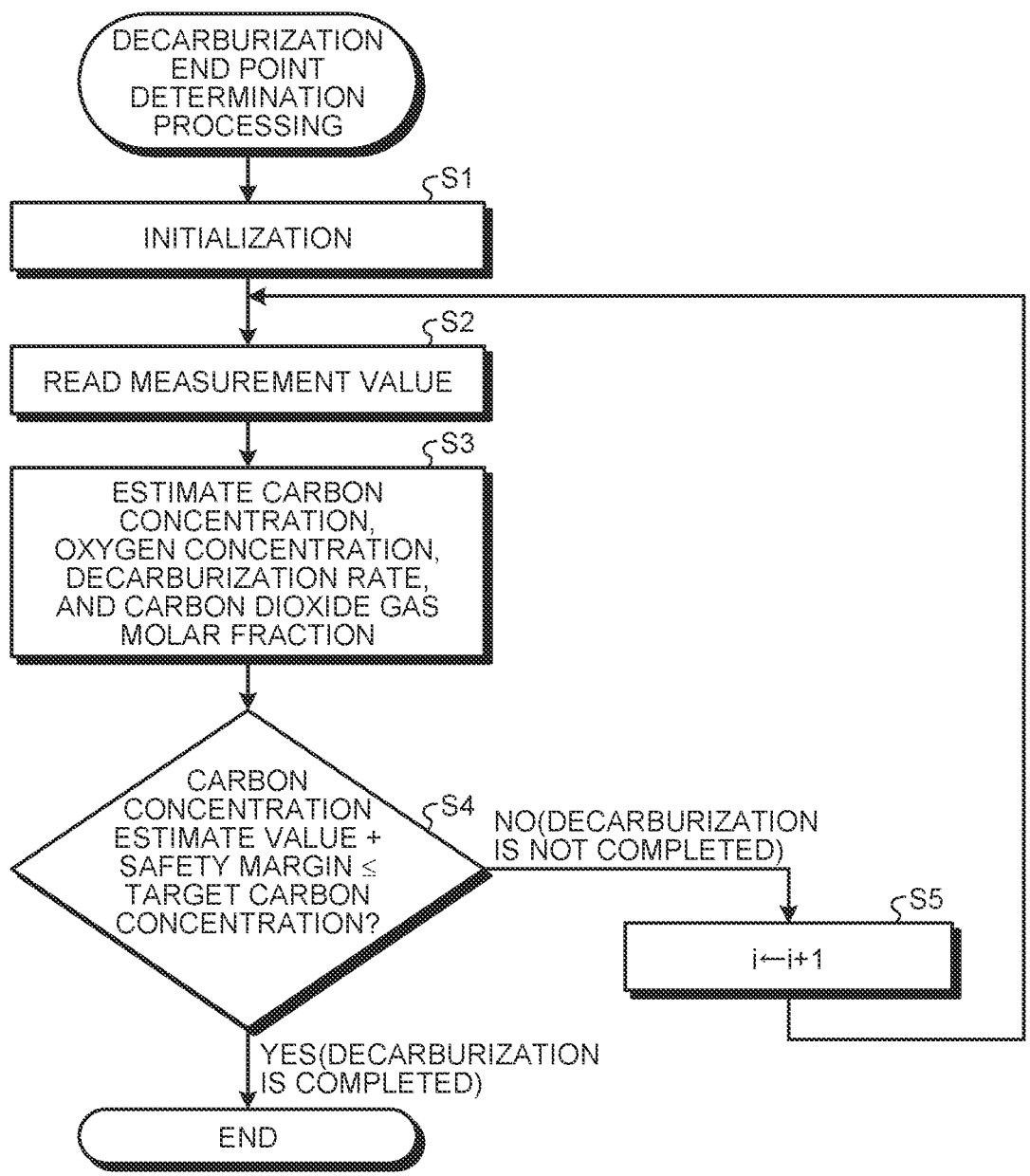
FIG. 2 is a flowchart illustrating a flow of decarburization end point determination processing that is one embodiment of the present invention.

FIG. 2 is a flowchart illustrating a flow of the decarburization end point determination processing that is one embodiment of the present invention. The decarburization end point determination processing illustrated in FIG. 2 is started at timing when the vacuum device 6 starts suction processing in the vacuum chamber 5, and the decarburization end point determination processing proceeds to processing of Step S1. Note that the initialization unit 11c1 resets a value of a program counter i that counts a loop count (time step) of the decarburization end point determination processing to 0 at the timing when the decarburization end point determination processing is started.

In the processing of Step S1, the initialization unit 11c1 stores the values of the constants listed in Table 5 into a region of the RAM 11a which region corresponds to the constants that are included in the model formula of the decarburization reaction and that are listed in Table 5, and stores an initial value 0.0080 [kg kg$^{-1}$ Pa$^{-1}$ m$^{-1}$ s$^{-1}$] of a decarburization capacity coefficient $K_v$ into a region of the RAM 11a which region corresponds to the decarburization capacity coefficient $K_v$ listed in Table 2. Note that these values may be appropriately changed according to a facility form or an operation form of the vacuum degassing facility 1. As a result, the processing of Step S1 is completed, and the decarburization end point determination processing proceeds to processing of Step S2.

In the processing of Step S2, the initialization unit 11c1 stores various measurement values output from the measurement value collection device 10 into a region of the RAM 11a which region corresponds to the input variables of the model formula of the decarburization reaction, which variables are listed in Table 3, and the measurement values of the output variables which values are calculated from the model formula of the decarburization reaction and are listed in Table 7. In addition, the initialization unit 11c1 copies the values in the region of the RAM 11a which region corresponds to the measurement values of the output variables, which measurement values are listed in Table 7, to a region of the RAM 11a which region corresponds to the output variables (initial values of the output variables) listed in Table 4. Note that at the start of the decarburization end point determination processing (program counter i=0), values measured immediately after tapping of the molten steel from a converter in the previous process may be used as measurement values of a carbon mass fraction (carbon concentration) and an oxygen mass fraction (dissolved oxygen concentration) of the molten steel listed in Table 7. As a result, the processing of Step S2 is completed, and the decarburization end point determination processing proceeds to processing of Step S3.

In the processing of Step S3, the state estimation unit 11c3 assumes the measurement value of the carbon mass fraction of the molten steel, the measurement value of the oxygen mass fraction of the molten steel, and a measurement value of a molar fraction of the carbon dioxide gas (carbon dioxide gas concentration) of the exhaust gas which values are stored in the RAM 11a in the processing of Step S2. That is, the state estimation unit 11c3 assumes that an estimate value of the carbon mass fraction of the molten steel, an estimate value of the oxygen mass fraction of the molten steel, and an estimate value of the molar fraction of the carbon dioxide gas of the exhaust gas respectively match the measurement values. Then, by an inverse analysis using Bayesian inference (statistical causal inference), the state estimation unit 11c3 calculates change histories of the carbon mass fraction of the molten steel, the oxygen mass fraction of the molten steel, and the molar fraction of the carbon dioxide gas of the exhaust gas over a past predetermined period (such as past 60 seconds) which change histories are causes of such a result.

Figure 3:
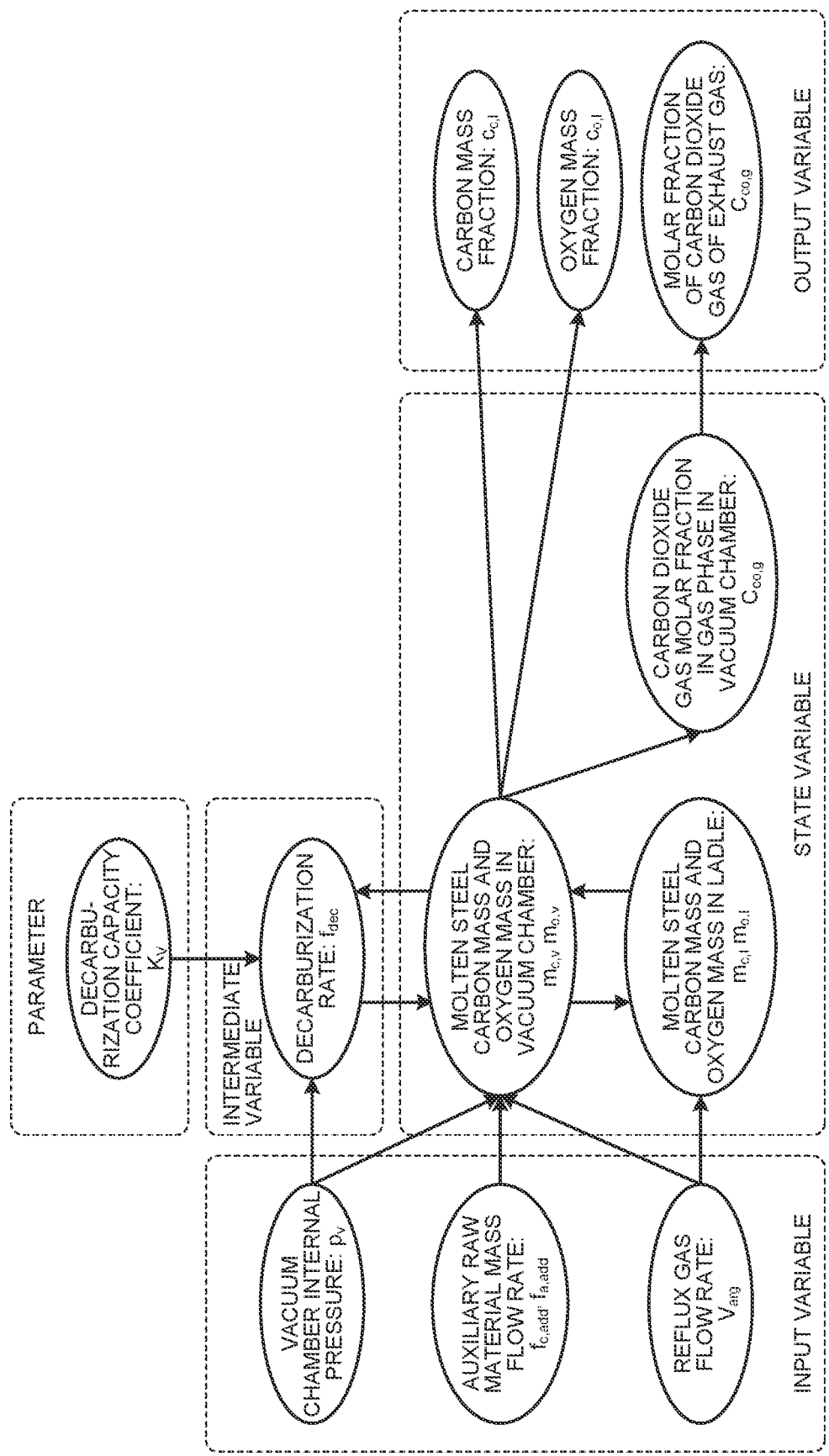
FIG. 3 is a view illustrating a causal relationship between variables related to vacuum decarburization treatment.

Here, in the Bayesian inference, the estimate values of the carbon mass fraction of the molten steel, the oxygen mass fraction of the molten steel, and the molar fraction of the carbon dioxide gas of the exhaust gas are expressed as probability distribution. Then, in Bayesian theory, when at least one of the carbon mass fraction of the molten steel, the oxygen mass fraction of the molten steel, and the molar fraction of the carbon dioxide gas of the exhaust gas becomes known, that is, when a measurement value thereof is acquired, a causal relationship between the variables related to the vacuum decarburization treatment illustrated in FIG. 3 is traced inversely. Thus, in the Bayesian theory, the most probable decarburization rate and decarburization capacity coefficient, and change histories of the carbon mass fraction of the molten steel, the oxygen mass fraction of the molten steel, and the molar fraction of the carbon dioxide gas of the exhaust gas are estimated.

Specifically, the state estimation unit 11c3 solves the following optimization problem. This means to calculate, on the assumption that the estimate values of the output variables at the current time step i match the measurement values, a value that is considered to be the most probable in model calculation with respect to each of the values of the state variables and the decarburization capacity coefficient within a past time horizon period h. Specifically, the decarburization reaction is expressed by model formulas expressed in the following formulas (6) to (11), and values of a state variable x and the decarburization capacity coefficient $K_v$ are given by probability distribution. The probability distribution expresses uncertainty that the values of the state variable x and the decarburization capacity coefficient $K_v$ are around these values. Thus, there is also uncertainty that a value of an output variable y during the progress of the decarburization reaction is around this. The following formula (5) expresses the above, and expresses the probability distribution of the output variable y (Gaussian distribution having a standard deviation σ with an estimate value y(i) being an average value) of when the state variable x and the decarburization capacity coefficient $K_v$ are in a given condition. However, a probability density function expressed in the formula (5) may be any kind. Note that an initial value of the probability distribution of the state variable x is set as the Gaussian distribution in which a value measured immediately before the start of the decarburization treatment is an average value and a value that is the same as a standard deviation of a measurement error quantified in advance is held as a standard deviation. However, even with a probability distribution setting method other than the present method, the function of the present invention is not impaired.

Then, when the value of the current output variable y is determined by actual measurement, the values of the past state variable x and decarburization capacity coefficient $K_v$ estimated uncertainly can also be estimated again with a certain degree of accuracy. The following formulas (1) to (4) express calculation formulas of going back to the past, and mean that the state variable x and the decarburization capacity coefficient $K_v$ return the most probable values (probability p being maximum) under the condition that the value of the output variable y is determined as a measurement value y-hat. Note that P( ) in the formula (1) means an inverse formula of the formula (5). As a result, the processing of Step S3 is completed, and the decarburization end point determination processing proceeds to processing of Step S4.

$$\max_{K_v} P(x(i-h), \ldots, x(i-1), K_V | y(i) = \hat{y}(i)) \quad (1)$$

$$x(i) = \begin{matrix} m_{c,v}(i) \\ m_{c,l}(i) \\ m_{o,v}(i) \\ m_{o,l}(i) \\ c_{co,g}(i) \end{matrix} \quad (2)$$

$$y(i) = \begin{bmatrix} c_{c,l}(i) \\ c_{o,l}(i) \\ c_{co,g}(i) \end{bmatrix} \quad (3)$$

$$\hat{y}(i) = \begin{bmatrix} \hat{c}_{c,l}(i) \\ \hat{c}_{o,l}(i) \\ \hat{c}_{co,g}(i) \end{bmatrix} \quad (4)$$

$$P(y(i)|x(i-h), \ldots, x(i-1), K_V) \sim N(y(i), \sigma) \quad (5)$$

$$x(i+1) = x(i) + \Delta t \cdot \frac{dx}{dt}\Big|_t \quad (6)$$

$$\frac{dm_{c,v}}{dt} = f_{cir}(c_{c,l} - c_{c,v}) + f_{dec} + f_{c,add} \quad (7)$$

$$\frac{dm_{c,l}}{dt} = f_{cir}(c_{c,v} - c_{c,l}) \quad (8)$$

$$\frac{dm_{o,v}}{dt} = f_{cir}(c_{o,l} - c_{o,v}) + \frac{M_o}{M_c} f_{dec} - \frac{3M_o}{2M_{al}} f_{a,add} \quad (9)$$

$$\frac{dm_{o,l}}{dt} = f_{cir}(c_{o,v} - c_{o,l}) \quad (10)$$

$$\frac{p_v V_v}{RT_g} \frac{dc_{co,g}}{dt} = -\frac{p_v}{RT_g} f_{dec} - \frac{P_{atm} V_{off,25}}{RT_{atm}} c_{co,g} \quad (11)$$

Note that the left side of the formula (7) expresses a change in carbon weight of the molten steel in the vacuum chamber, the first term of the three terms on the right side expresses an influence of reflux, the second term expresses an influence of the vacuum decarburization, and the third term expresses an influence of the added auxiliary raw material. In addition, the left side of the formula (8) expresses a change in carbon weight of the molten steel in the ladle, and the right side expresses an influence of reflux. In addition, the left side of the formula (9) expresses a change in dissolved oxygen weight of the molten steel in the vacuum chamber, the first term of the three terms on the right side expresses an influence of reflux, the second term expresses an influence of the vacuum decarburization, and the third term expresses an influence of the added auxiliary raw material. In addition, the left side of the formula (10) expresses a change in dissolved oxygen weight of the molten steel in a molten steel ladle, and the right side expresses an influence of reflux. In addition, the formula (11) expresses molar equilibrium between a carbon dioxide gas in a gas phase in the vacuum chamber and the carbon dioxide gas in the exhaust gas (number of moles of carbon dioxide gas molecules is in equilibrium). The expression on the left side expresses the number of moles of the carbon dioxide gas in the gas phase in the vacuum chamber, the first term on the right side expresses the number of moles of the carbon dioxide gas that flows into the gas phase from the molten steel by the vacuum decarburization, and the second term on the right side expresses the number of moles of the carbon dioxide gas diffused to the atmosphere by the exhaust gas.

In the processing of Step S4, the end point determination unit 11c4 determines whether a value acquired by addition of a predetermined value as a safety margin to the average value of the probability distribution of the carbon concentration of the molten steel (carbon concentration estimate value) calculated in the processing of Step S3 is equal to or smaller than target carbon concentration. Then, as a result of the determination, in a case where the value acquired by the addition of the predetermined value to the carbon concentration estimate value is equal to or smaller than the target carbon concentration (Step S4: Yes), the end point determination unit 11c4 determines that the vacuum decarburization treatment is completed, and ends the series of decarburization end point determination processing. On the other hand, in a case where the value acquired by the addition of the predetermined value to the carbon concentration estimate value is larger than the target carbon concentration (Step S4: No), the end point determination unit 11c4 determines that the vacuum decarburization treatment is not completed, increments the value of the program counter i by one as processing of Step S5, and then returns the decarburization end point determination processing to the processing of Step S2.

Note that although the average value of the probability distribution of the molten steel carbon concentration is used for the determination of the completion of the vacuum decarburization treatment in the present embodiment, a maximum value, or a value acquired by addition of a value acquired by multiplication of a standard deviation by 3 to the average value may be used. Furthermore, in a case where it is determined that the vacuum decarburization treatment is not completed, the decarburization end point determination processing returns from the processing of Step S4 to the processing of Step S2 via the processing of Step S5. A loop of returning from the processing of Step S4 to the processing of Step S2 is desirably performed in a cycle time of about 5 seconds.

Examples

Figure 4:
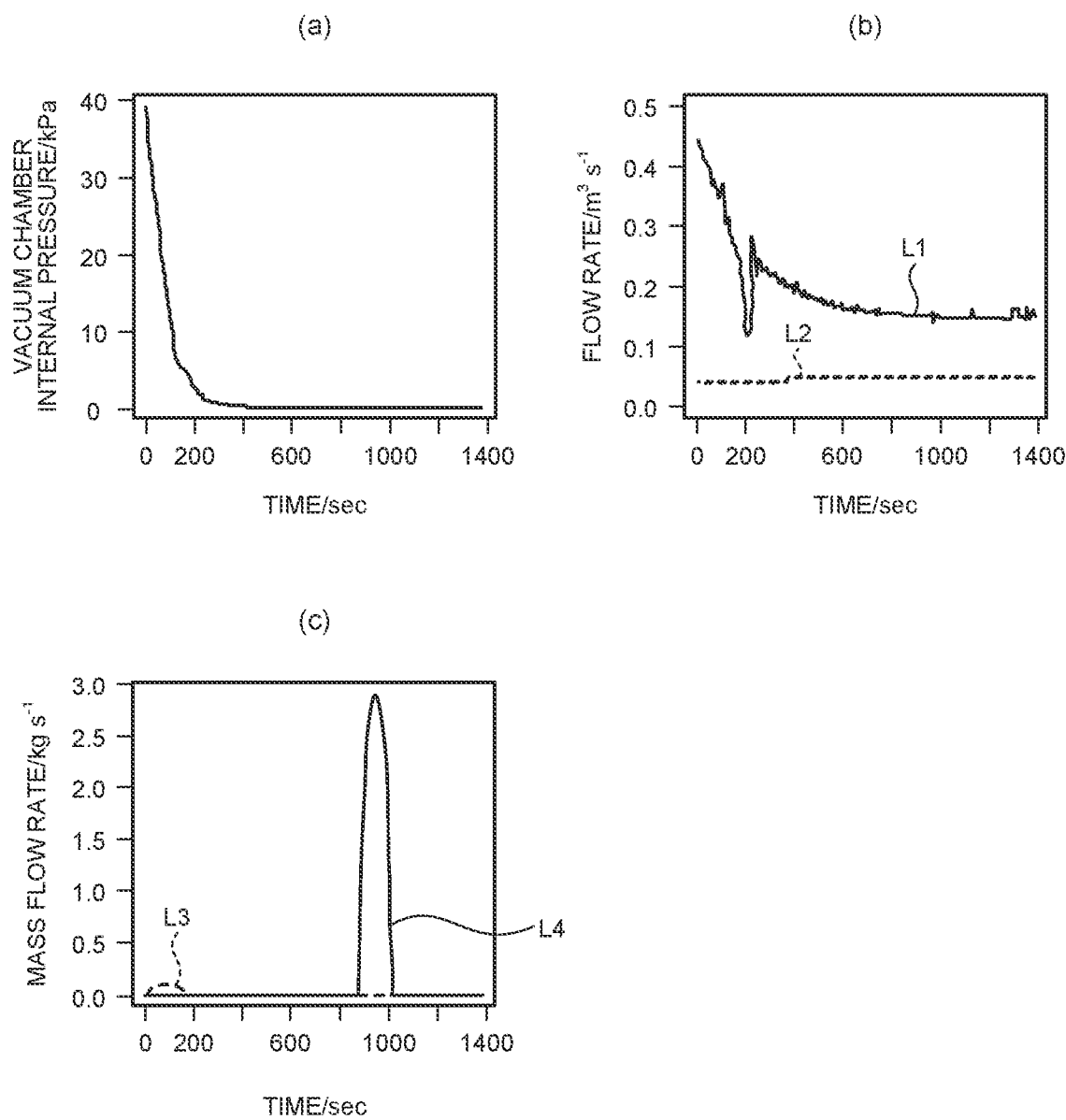
FIG. 4 is a view illustrating time-series changes of input variables.

FIG. 4 is a view illustrating a time-series change in input variables in vacuum decarburization treatment with 250 ton/charge and target carbon concentration of 13 ppm. A time-series change in the internal pressure of the vacuum chamber is illustrated in FIG. 4(a), time-series changes in the flow rates of the exhaust gas (line L1) and the argon gas (line L2) are illustrated in FIG. 4(b), and time-series changes in the mass flow rates of carbon (line L3) and aluminum (line L4) flowing into the molten steel from the added auxiliary raw material are illustrated in FIG. 4(c).

Figure 5:
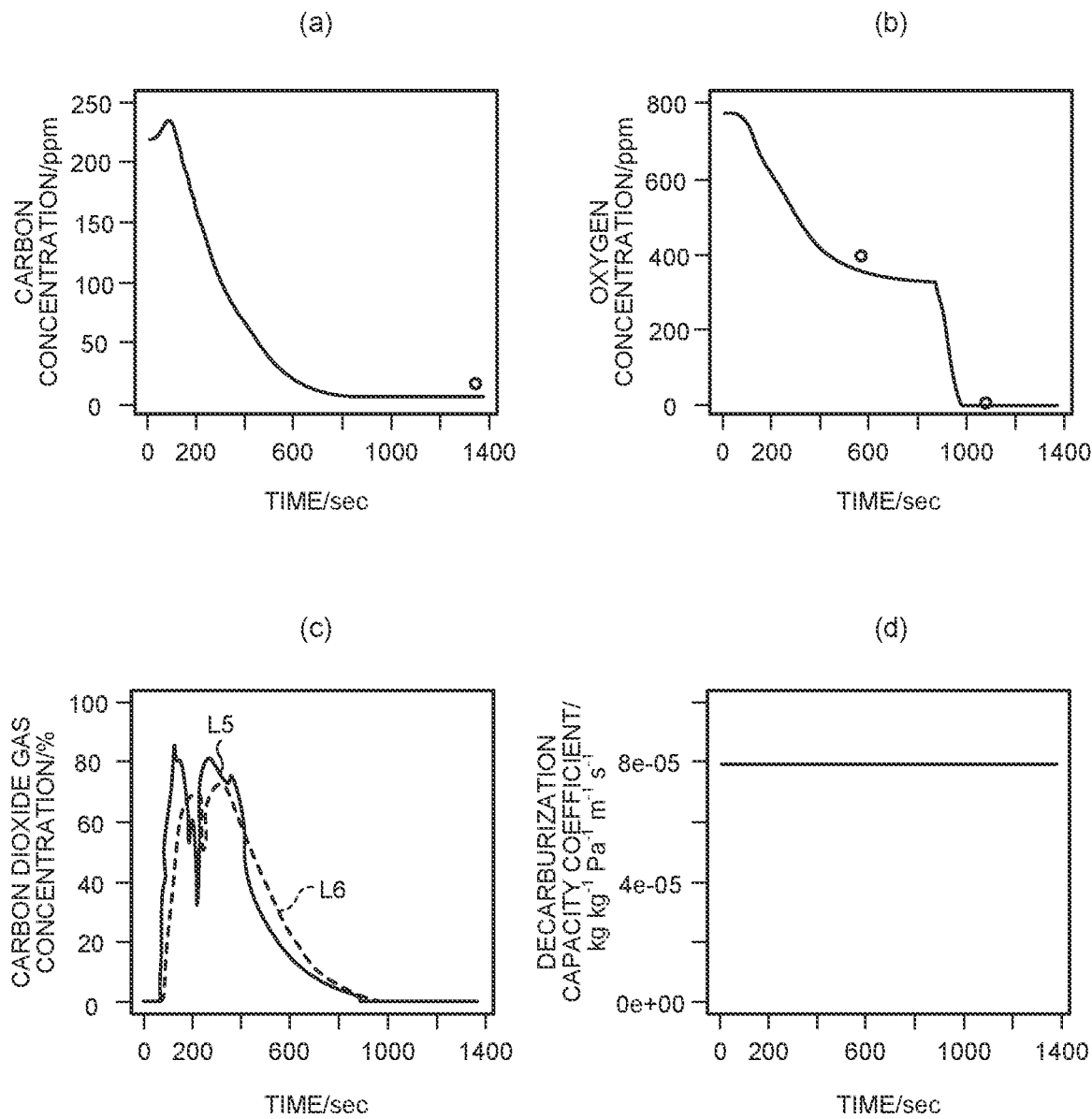
FIG. 5 is a view illustrating time-series changes of output variables according to a conventional method.

In addition, FIG. 5 is a view illustrating time-series changes in output variables of when the vacuum decarburization treatment illustrated in FIGS. 4(a) to (c) is performed. Time-series changes in the estimate value (line) and the measurement value (plot) of the molten steel carbon concentration are illustrated in FIG. 5(a), time-series changes in the estimate value (line) and the measurement value (plot) of the molten steel oxygen concentration are illustrated in FIG. 5(b), time-series changes in the estimate value (line L5) and the measurement value (line L6) of the carbon dioxide gas concentration of the exhaust gas are illustrated in FIG. 5(c), and a time-series change in the decarburization capacity coefficient is illustrated in FIG. 5(d). Note that the estimate values herein mean values estimated by a conventional method that does not learn the decarburization capacity coefficient of the model formula from online measurement values.

As illustrated in FIG. 5(a), the molten steel carbon concentration at the time of completion of the vacuum decarburization treatment is estimated to be 13 ppm in the conventional method, and this is a value smaller by 37 ppm than the measurement value of 50 ppm. In addition, as illustrated in FIG. 5(b), the molten steel oxygen concentration at 570 seconds is estimated to be 358 ppm in the conventional method, and this is a value smaller by 33 ppm than the measurement value of 391 ppm. Furthermore, as illustrated in FIG. 5(c), the carbon dioxide gas concentration of the exhaust gas at 90 seconds is estimated to be 58%, and this is a value 40% larger than the measurement value of 18%. The reason why these results are acquired is that a decarburization amount is estimated to be larger than an actual value in the conventional method. As a result, it is erroneously determined that the molten steel carbon concentration reaches the target value of 13 ppm at a time point of 669 seconds, and a decarburization treatment failure is caused since the molten steel carbon concentration does not actually reach the target value.

Figure 6:
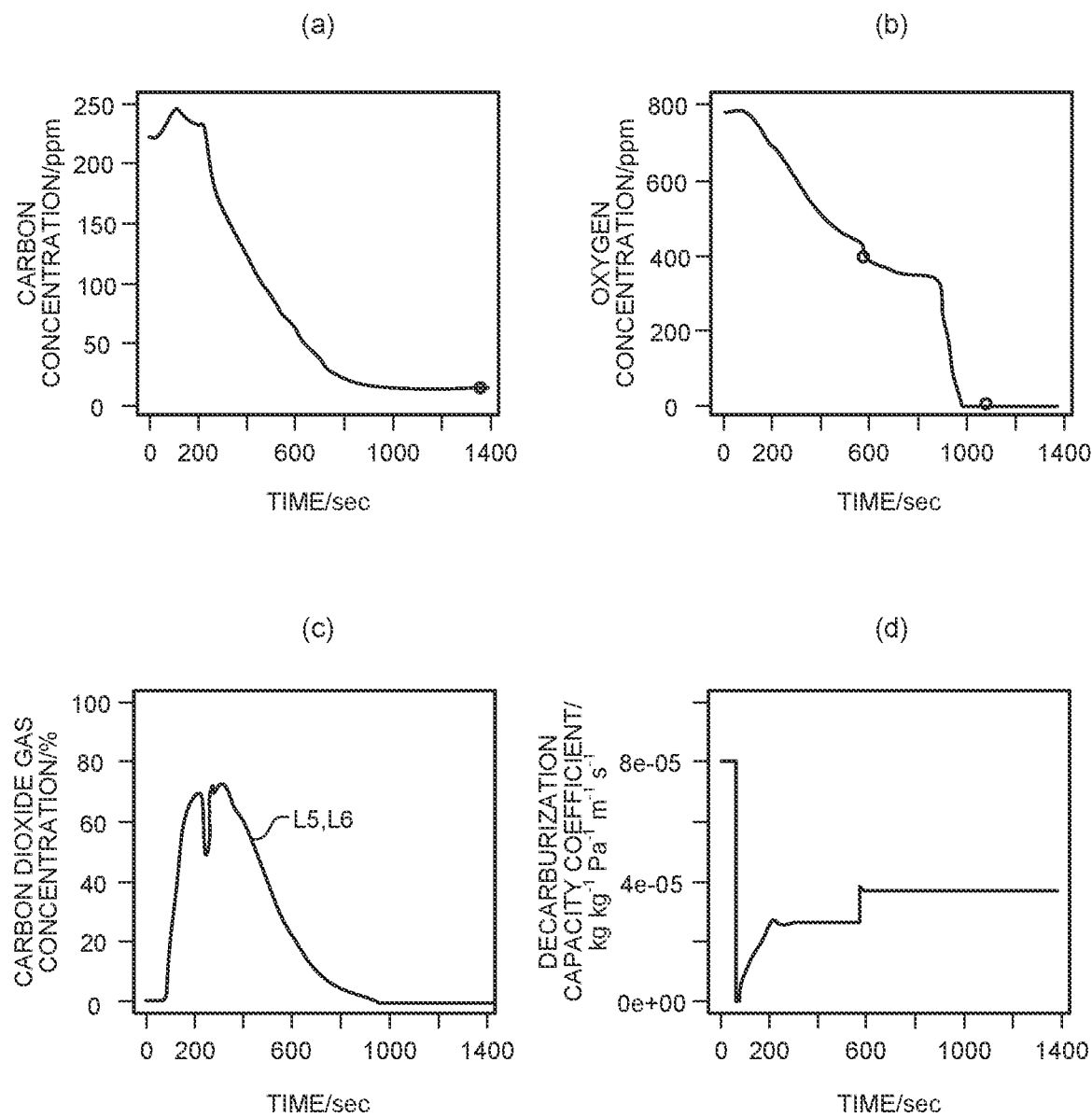
FIG. 6 is a view illustrating time-series changes of output variables according to the present invention.

On the other hand, FIG. 6 is a view illustrating a result of application of the present invention to the vacuum decarburization treatment illustrated in FIGS. 4(a) to (c). Time-series changes in the estimate value (line) and the measurement value (plot) of the molten steel carbon concentration are illustrated in FIG. 6(a), time-series changes in the estimate value (line) and the measurement value (plot) of the molten steel oxygen concentration are illustrated in FIG. 6(b), time-series changes in the actual measurement value (line L5) and the measurement value (line L6) of the carbon dioxide gas concentration of the exhaust gas are illustrated in FIG. 6(c), and a time-series change in the decarburization capacity coefficient is illustrated in FIG. 6(d). In the present invention, a desirable decarburization capacity coefficient value is learned online from a difference between an online measurement value and an estimate value by the model formula of the decarburization reaction with respect to each of the carbon dioxide gas concentration of the exhaust gas and the molten steel oxygen concentration, and the learned decarburization capacity coefficient value is reflected in the model formula of the decarburization reaction. Specifically, the value of the decarburization capacity coefficient is corrected as illustrated in FIG. 6(d) in such a manner that the molten steel oxygen concentration at 570 seconds matches the measurement value as illustrated in FIG. 6(b) and the estimate value (line L5) of the carbon dioxide gas concentration of the exhaust gas matches the measurement value (line L6) as illustrated in FIG. 6(c).

Thus, as illustrated in FIG. 6(a), the molten steel carbon concentration can be estimated in such a manner as to finally match the measurement value of the molten steel carbon concentration without direct correction of the molten steel carbon concentration. This means that the value of the decarburization capacity coefficient can be learned online to be a value close to an actual value and reflected in the model formula by application of the present invention even when the value of the decarburization capacity coefficient included in the model formula of the decarburization reaction is set in a manner of being deviated from the actual value. That is, by applying the present invention, it is possible to estimate the molten steel carbon concentration with higher accuracy than the conventional method. As a result, it is possible to determine the end point of the vacuum decarburization treatment at appropriate timing without redundant treatment time. In addition, the secondary refining operation itself in the steel mill becomes highly accurate and stable operation. As a result, treatment time is shortened. Thus, variations in components of the molten steel in the steel mill are reduced, and it becomes possible to produce the molten steel highly accurately and stably.

Although an embodiment to which the invention made by the present inventors is applied has been described above, the present invention is not limited by the description and drawings included in a part of the disclosure of the present invention according to the present embodiment. That is, other embodiments, examples, operation techniques, and the like made by those skilled in the art on the basis of the present embodiment are all included in the scope of the present invention.

INDUSTRIAL APPLICABILITY

According to the present invention, a decarburization end point determination method and a decarburization end point determination device that are capable of accurately estimating carbon concentration of molten steel and accurately determining an end point of vacuum decarburization treatment can be provided. Furthermore, according to the present invention, it is possible to provide a secondary refining operation method for steel making capable of performing secondary refining operation highly accurately and stably. Furthermore, according to the present invention, a method for producing molten steel with which method the molten steel can be produced highly accurately and stably can be provided.

REFERENCE SIGNS LIST

1 VACUUM DEGASSING FACILITY
2 LADLE
3 SUCTION PIPE
4 EXHAUST PIPE
5 VACUUM CHAMBER
6 VACUUM DEVICE
7 OXYGEN FEEDING LANCE
8 HOPPER
10 MEASUREMENT VALUE COLLECTION DEVICE

The invention claimed is:
1. A decarburization end point determination method for determining a completion time point of vacuum decarburization treatment in a facility that performs the vacuum decarburization treatment of reducing carbon concentration of molten steel by degassing a vacuum chamber, the method comprising:
  estimating the carbon concentration and oxygen concentration of the molten steel and carbon dioxide gas concentration of exhaust gas in the vacuum chamber during the vacuum decarburization treatment by using measurement values of the carbon concentration and the oxygen concentration of the molten steel before the vacuum decarburization treatment is started,
  a measurement value of internal pressure of the vacuum chamber, and
  a model formula of the vacuum decarburization treatment;
  correcting a parameter included in the model formula in such a manner as to reduce
    a difference between an estimate value and a measurement value of the oxygen concentration of the molten steel at timing when the oxygen concentration of the molten steel is measured during the vacuum decarburization treatment and
    a difference between an estimate value and a measurement value of the carbon dioxide gas concentration of the exhaust gas at timing when the carbon dioxide gas concentration of the exhaust gas is measured during the vacuum decarburization treatment;
  estimating the carbon concentration of the molten steel by using the model formula in which the parameter is corrected;
  determining timing when an estimate value reaches a target value as the completion time point of the vacuum decarburization treatment; and
  performing operation end determination of a secondary refining process for steel making by terminating the vacuum decarburization treatment at the determined completion time point.

2. The decarburization end point determination method according to claim 1, wherein the correcting includes a step of calculating a probable value of the parameter when at least one of the measurement value of the oxygen concentration of the molten steel and the measurement value of the carbon dioxide gas concentration of the exhaust gas is acquired, by an inverse analysis using Bayesian inference.

3. The decarburization end point determination method according to claim 2, wherein the parameter is a decarburization capacity coefficient.

4. The decarburization end point determination method according to claim 1, wherein the parameter is a decarburization capacity coefficient.

5. The decarburization end point determination method according to claim 1, further comprising: displaying the determined completion time point of the vacuum decarburization treatment on a display device to enable operator control of the vacuum decarburization treatment.

6. The decarburization end point determination method according to claim 1, wherein the correcting includes:
  at a timing when a measurement value of at least one of the carbon concentration of the molten steel, the oxygen concentration of the molten steel and the carbon dioxide gas concentration of the exhaust gas is acquired during the vacuum decarburization treatment,
    determining that an estimate value corresponding to an acquired measurement value is determined by the acquired measurement value, and
    calculating, by an inverse analysis using Bayesian inference, change histories of the carbon concentration and the oxygen concentration of the molten steel and the carbon dioxide gas concentration of the exhaust gas in the vacuum chamber during the vacuum decarburization treatment over a past predetermined period.

7. A method for producing molten steel, comprising producing the molten steel by using the method according to claim 1.

8. A decarburization end point determination device that determines a completion time point of vacuum decarburization treatment in a facility that performs the vacuum decarburization treatment of reducing carbon concentration of molten steel by degassing a vacuum chamber, the device comprising a processor comprising hardware, the processor being configured to:
  estimate the carbon concentration and oxygen concentration of the molten steel and carbon dioxide gas concentration of exhaust gas in the vacuum chamber during the vacuum decarburization treatment by using measurement values of the carbon concentration and the oxygen concentration of the molten steel before the vacuum decarburization treatment is started, a measurement value of internal pressure of the vacuum chamber, and a model formula of the vacuum decarburization treatment;
  correct a parameter included in the model formula in such a manner as to reduce
    a difference between an estimate value and a measurement value of the oxygen concentration of the molten steel at timing when the oxygen concentration of the molten steel is measured during the vacuum decarburization treatment and
    a difference between an estimate value and a measurement value of the carbon dioxide gas concentration of the exhaust gas at timing when the carbon dioxide gas concentration of the exhaust gas is measured during the vacuum decarburization treatment;
  estimate the carbon concentration of the molten steel by using the model formula in which the parameter is corrected;
  determine timing when an estimate value reaches a target value as the completion time point of the vacuum decarburization treatment; and
  perform operation end determination of a secondary refining process for steel making by terminating the vacuum decarburization treatment at the determined completion time point.

9. The decarburization end point determination device according to claim 8, wherein the processor is configured to calculate a probable value of the parameter when at least one of the measurement value of the oxygen concentration of the molten steel and the measurement value of the carbon dioxide gas concentration of the exhaust gas is acquired, by an inverse analysis using Bayesian inference.

10. The decarburization end point determination device according to claim 9, wherein the parameter is a decarburization capacity coefficient.

11. The decarburization end point determination device according to claim 8, wherein the parameter is a decarburization capacity coefficient.

* * * * *